Feb. 21, 1928.
C. C. ROGERS
1,659,747
DIRIGIBLE HEADLIGHT
Filed June 1, 1926
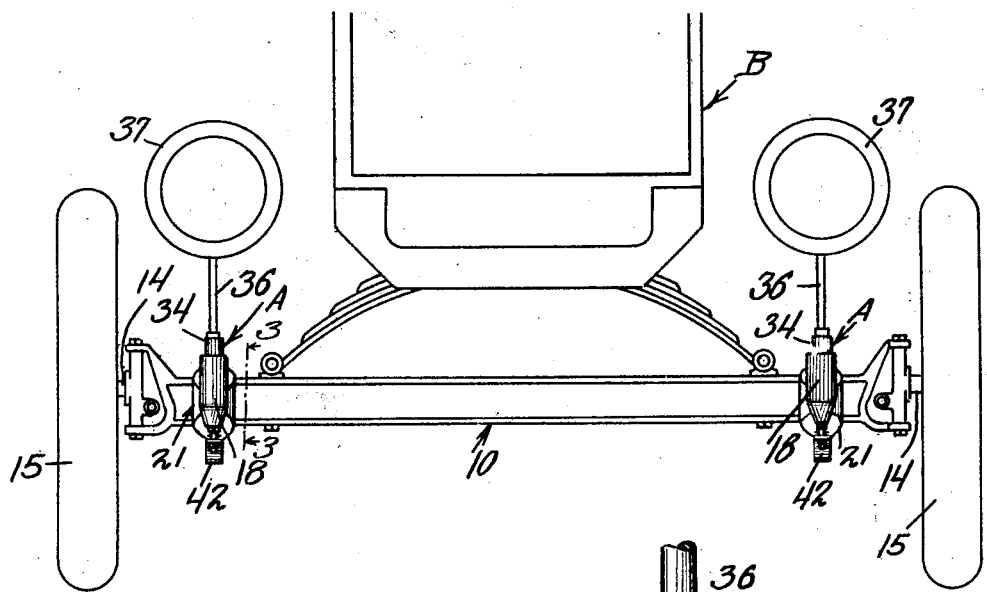
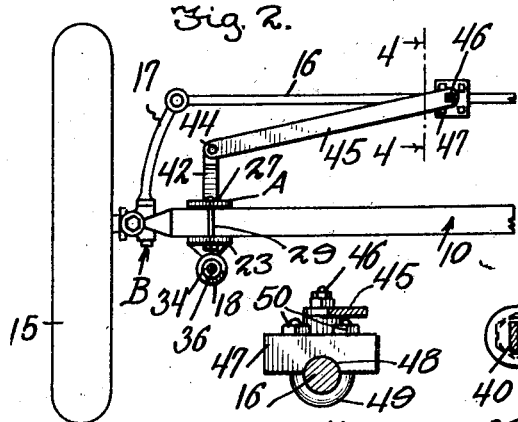
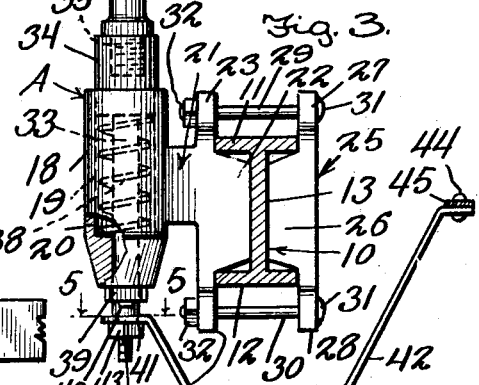

Patented Feb. 21, 1928.

1,659,747

UNITED STATES PATENT OFFICE.

CHARLES C. ROGERS, OF EUREKA, MONTANA, ASSIGNOR OF ONE-HALF TO ORVILLE C. STANSELL, OF ASHTON, IDAHO.

DIRIGIBLE HEADLIGHT.

Application filed June 1, 1926. Serial No. 113,086.

This invention appertains generally to new and useful improvements in automobile appliances and has more specific reference to the provision of a reliable dirigible headlight construction.

The present invention comprehends and has for its primary object the provision of means for mounting the headlights of an automobile or the like for simultaneous oscillatory movement controlled by the steering mechanism, so that the light rays are always maintained directly in advance of the course pursued by the vehicle, thereby reducing the dangers and inconveniences of night driving to a minimum.

Another object of the invention is the provision of novel means for rotatably mounting the headlight supporting standards on the vehicle and novel means for operatively connecting said standards with the steering gear of the said vehicle whereby upon turning movement of the front wheels thereof the headlights will be turned therewith.

A further object of the invention is to provide an improved automobile appliance of the above character which will be durable and efficient in use, one which will be simple and easy to manufacture and one which can be placed on the market and incorporated with an automobile at a small cost.

With these and other objects in view, the invention consists in the novel construction, arrangement and formation of parts as will be hereinafter more fully described, illustrated in the accompanying drawings and specifically pointed out in the appended claims.

In the drawings forming a part of this application and wherein like characters of reference denote corresponding parts throughout the several views:

Figure 1 is a fragmentary front elevation of an automobile showing the improved dirigible headlights incorporated therewith.

Figure 2 is a fragmentary top plan view showing the connections between the appliance and the steering rod.

Figure 3 is a sectional view taken on line 3—3 of Figure 1.

Figure 4 is a sectional view taken on line 4—4 of Figure 2.

Figure 5 is a sectional view taken on line 5—5 of Figure 3.

Referring to the drawings in detail, wherein for the purpose of illustration has been disclosed a preferred embodiment of the present invention, the letter A generally indicates the improved automobile appliance and B an automobile with which the same is associated.

The automobile B can be of any preferred character or make and embodies the usual front dead axle 10 of substantially I-beam construction in cross section and comprising the upper and lower flanges 11 and 12 respectively and the vertical connecting web 13. The axle 10 carries the swinging front axles 14 on which are mounted the front steering wheels 15. The numeral 16 indicates the conventional steering rod connected with one of the swinging axles 14 through the medium of the connecting link 17.

The improved appliance A comprises the vertically disposed elongated body 18 provided with a vertical central bore 19 reduced at its lower end to form the resultant shoulder 20. Formed integrally with the body 10 is the stationary clamping block 21 which includes the centrally enlarged portion 22 adapted to engage the front face of the web 13, said block being provided with the upper and lower oppositely directed flanges 23 and 24 which overlap and extend beyond the axle. A similarly constructed movable clamping block 25 is also provided and this block includes the centrally enlarged portion 26 adapted to engage the rear face of the web 13, said block being provided with the upper and lower oppositely directed flanges 27 and 28. Passing through the flanges 23 and 27 is a securing bolt 29 while passing through the flanges 24 and 28 is a suitable securing bolt 30, each of said bolts being provided at one end with a head 31 and at its opposite end with a nut 32 whereby the said body 18 is securely clamped to the axle 10.

Arranged within the bore 19 of the body 18 is the lamp spindle 33 provided at its upper end with the enlarged head 34 having a threaded socket therein for the reception of the lower threaded end 35 of the lamp support 36 carrying at its upper end the lamp 37. Encircling the spindle 33 within the bore 19 is a tension coil spring 38 bearing respectively at its upper and lower ends against the head 34 and shoulder 20. This spring is provided to prevent the excessive jarring of the lamp 37.

The spindle 33 projects downwardly beyond the body 18 and has secured thereto a suitable clamping nut 39, the extreme lower end of the spindle being preferably flattened as at 40. The numeral 42 denotes a substantially U-shaped lever, the forward end 41 thereof being provided with a suitable slot for receiving the flattened portion 40 of the spindle, a nut 43 being provided to secure said lever to said spindle, a pin 43' retaining the nut 43 in place. The opposite end of the lever 42 has pivotally connected thereto as at 44, one end of the link 45, the opposite end of said link being pivotally connected as at 46 to the clamping member 47. The bottom face of the clamping member 47 is provided with a semi-circular groove 48 to receive the steering rod 16 as shown in Figure 4 and suitable U-shaped securing bolts 49 are provided whereby to secure the clamping plate to the said steering rod, suitable nuts 50 engaging the opposite ends of the said bolts 49 above the clamping plate 47.

Thus, it will be seen that upon movement of the steering rod 16, this movement will be imparted to the lamp spindle 33 through the link 45 and lever 42 with the result that the said spindle will be oscillated and the lamp supports moving therewith will cause the lamps 37 to be turned so that the light rays therefrom will be directed in advance of the course pursued by the vehicle. When the wheels 15 are turned, the headlights will be turned therewith.

While there has been shown and described a preferred embodiment of the present invention, it is to be understood that changes in the details of construction thereof may be resorted to without departing from or sacrificing the spirit of the invention so long as such changes fall within the scope of the appended claims.

What is claimed is:

1. In a dirigible headlight, the combination with the front axle and steering rod of a vehicle, of a lamp support including a body having a vertically disposed bore extending therethrough, said bore being reduced adjacent its lower end to form a resultant shoulder, means for securing said body to the axle of the vehicle, a lamp spindle rotatably mounted within said bore and projecting beyond the body at both ends thereof, said spindle being provided at its upper end with an enlarged head while its lower end is flattened, a lamp support carried by the said head, a spring encircling said spindle within said bore and bearing at its opposite ends against said head and shoulder, a substantially U-shaped lever having one end thereof provided with a slot for receiving the flattened end of said spindle, and a link connection between the other end of said lever and the steering rod.

2. In a dirigible headlight structure of the character described, a lamp supporting bracket comprising a pair of complementary members adapted to be clamped together on opposite sides of a vehicle axle, an upright sleeve carried by one of said members and having a central enlarged chamber therein, a spindle extending through said sleeve and having a head arranged to snugly fit in and close the upper part of said chamber, a lamp supporting standard having one end fixed in said head, resilient means within the chamber and bearing against the under side of said head to resiliently support said standard, means for connecting the lower end of said spindle to a steering rod, and means for securing said steering rod connecting means to the spindle.

In testimony whereof I affix my signature.

CHARLES C. ROGERS.